United States Patent [19]

Bonerb et al.

[11] Patent Number: 4,735,457
[45] Date of Patent: Apr. 5, 1988

[54] FREIGHT VEHICLE WITH A CONVERTIBLE CARGO SPACE

[76] Inventors: Vincent C. Bonerb; Peter J. Bonerb; James J. Bonerb; Thomas J. Bonerb, all of All-Flow Inc., 4409 S. Park Ave., Buffalo, N.Y. 14219

[21] Appl. No.: 946,363

[22] Filed: Dec. 24, 1986

[51] Int. Cl.⁴ .............................................. B65G 67/02
[52] U.S. Cl. ................................ 298/27; 105/243; 220/1.5; 220/85 B; 222/105; 222/183; 296/10; 296/27; 298/38
[58] Field of Search ......................... 414/304, 523, 527; 298/24-38; 222/105, 183, 610; 220/1.5, 85 B; 105/243, 239; 296/10, 24 R, 27

[56] References Cited

U.S. PATENT DOCUMENTS

| | | | |
|---|---|---|---|
| Re. 32,232 | 8/1986 | Bonerb et al. | 222/95 |
| 612,053 | 10/1898 | Penn et al. | |
| 2,732,099 | 1/1956 | Davis | |
| 2,746,651 | 5/1956 | Lewis | |
| 2,792,262 | 5/1957 | Hathorn | |
| 2,888,885 | 6/1959 | Dorey | 298/30 X |
| 2,931,523 | 4/1960 | Nelligan | |
| 3,034,454 | 5/1962 | Tatarchuk | 298/24 X |
| 3,139,998 | 7/1964 | Seaman | |
| 3,270,921 | 9/1966 | Nadolske et al. | |
| 3,273,761 | 9/1966 | Langen | |
| 3,351,235 | 11/1967 | Paton | |
| 3,396,762 | 8/1968 | Paton | |
| 3,421,663 | 1/1969 | Paton | |
| 3,421,665 | 1/1969 | Paton | |
| 3,456,834 | 7/1969 | Paton | |
| 3,502,240 | 3/1970 | Paton | |
| 3,514,151 | 5/1970 | Hacker | |
| 3,583,330 | 6/1971 | Freud et al. | |
| 3,587,936 | 6/1971 | Riotto | |
| 3,659,899 | 5/1972 | Phillips et al. | 298/22 R |
| 3,711,157 | 1/1973 | Smock | 298/8 R |
| 3,738,511 | 6/1973 | Lemon et al. | |
| 3,777,938 | 12/1973 | Nikowitz et al. | |
| 3,784,255 | 1/1974 | Smock | 298/22 R |
| 3,858,772 | 1/1975 | Myers, Jr. | |
| 3,918,604 | 11/1975 | Kersten | |
| 4,092,051 | 5/1978 | D'Orazio | 298/24 |
| 4,155,469 | 5/1979 | Cole | 414/524 |
| 4,241,947 | 12/1980 | Schroder | 296/10 |
| 4,421,250 | 12/1983 | Bonerb et al. | 222/95 |
| 4,449,646 | 5/1984 | Bonerb et al. | 222/95 |
| 4,453,645 | 6/1984 | Usui et al. | 220/22 |
| 4,476,998 | 10/1984 | Bonerb et al. | 222/61 |
| 4,487,335 | 12/1984 | Bonerb et al. | 222/57 |
| 4,497,259 | 2/1985 | Titterton | 105/359 |
| 4,534,596 | 8/1985 | Bonerb | 298/27 |
| 4,572,579 | 2/1986 | Saito et al. | 298/1 A |
| 4,574,984 | 3/1986 | Bonerb | 222/61 |
| 4,583,663 | 4/1986 | Bonerb | 222/61 |
| 4,603,795 | 8/1986 | Bonerb | 222/262 |
| 4,606,570 | 8/1986 | Neumann | 296/10 |

FOREIGN PATENT DOCUMENTS

| | | |
|---|---|---|
| 650159 | 6/1964 | Belgium. |
| 1100852 | 9/1955 | France. |
| 1199775 | 12/1959 | France. |
| US82/00510 | 11/1982 | PCT Int'l Appl. |

Primary Examiner—Frank E. Werner
Assistant Examiner—Janice Krizek
Attorney, Agent, or Firm—Bernard, Rothwell & Brown

[57] ABSTRACT

Improvements in a freight vehicle having a cargo space convertible from that suitable for handling piece goods to that suitable for bulk material. A conventional cargo space for piece goods has openings for filling and discharging bulk material. A double-walled inflatable bag having its bottom attached to a rigid support platform is positioned in erected condition to handle bulk material and is movable to a stored position near the roof of the cargo space to allow handling of piece goods.

8 Claims, 6 Drawing Sheets

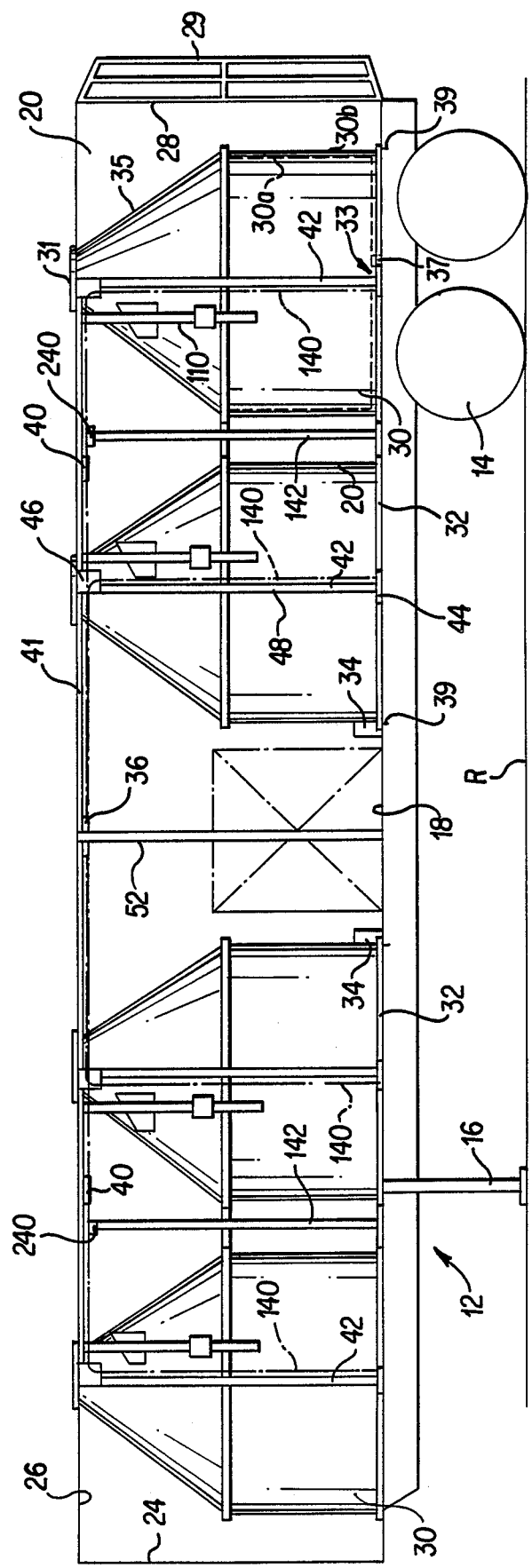

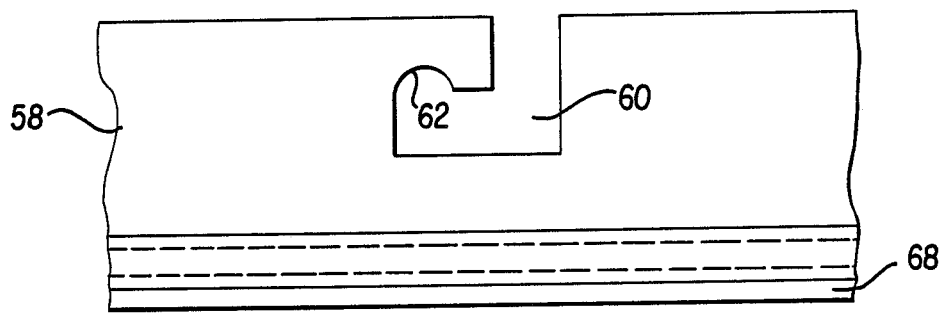
FIG. 5
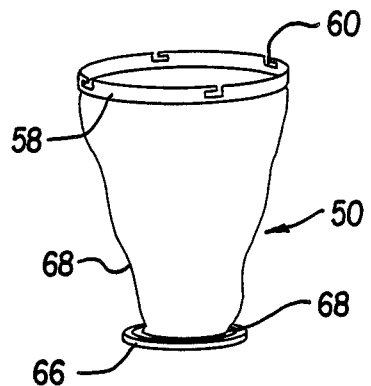
FIG. 2
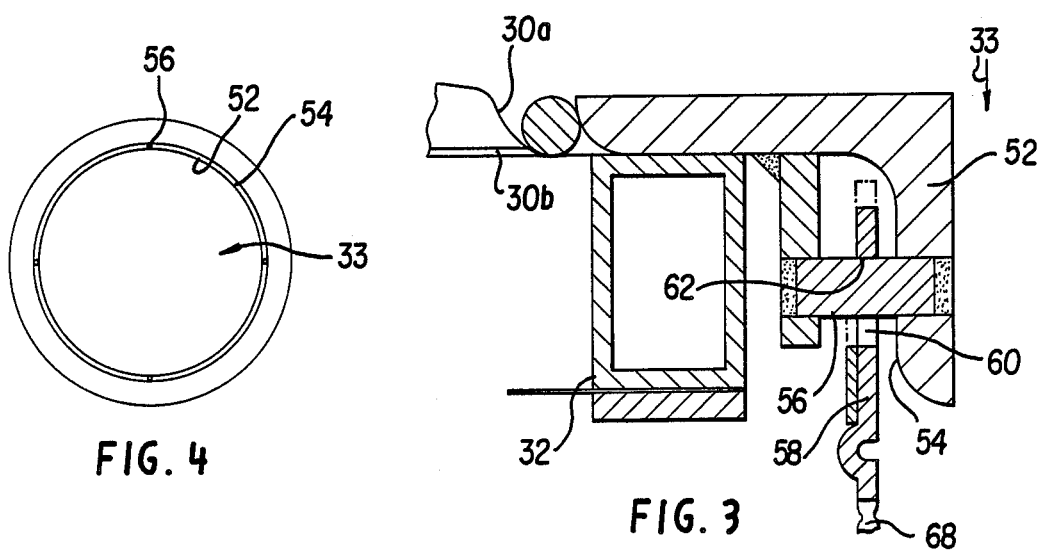
FIG. 4
FIG. 3

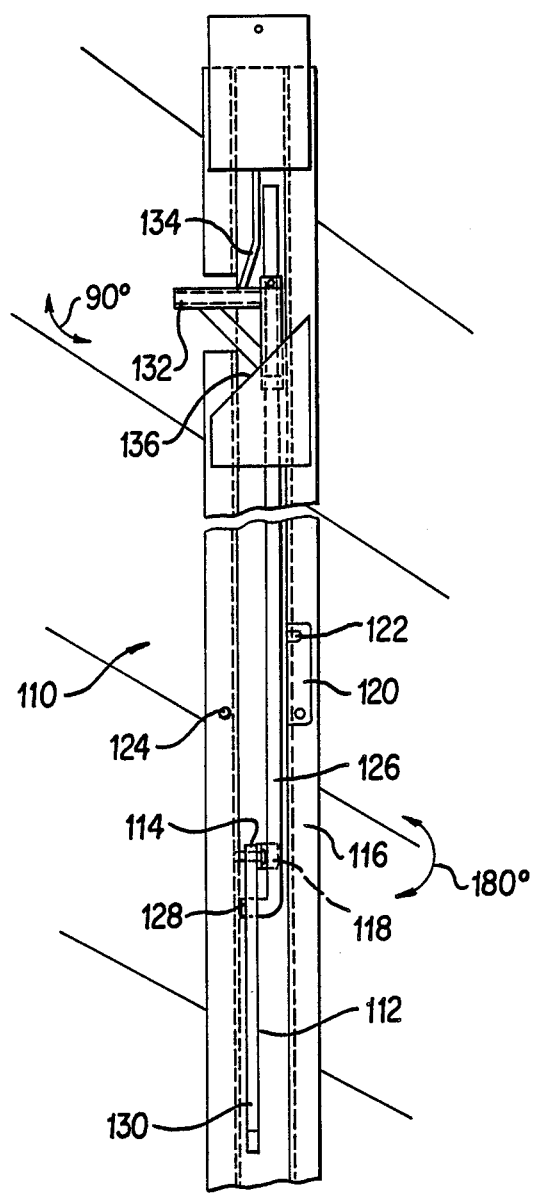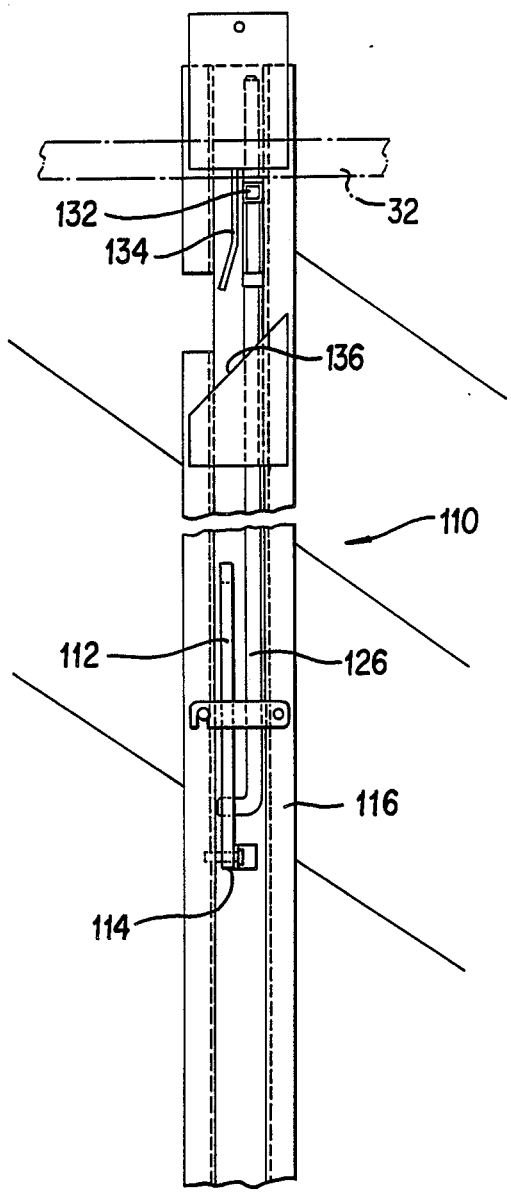
FIG. 9
FIG. 10

FREIGHT VEHICLE WITH A CONVERTIBLE CARGO SPACE

BACKGROUND OF THE INVENTION

1. Field of the Invention

This invention relates to improvements in freight vehicles having a cargo space convertible for handling piece goods or bulk granular, powder or flake material.

2. Prior Art

The desirability of having the cargo space of a freight vehicle which would be suitable for handling either piece goods or bulk goods is well known. The obvious advantage is that the same cargo space on the same vehicle could handle either of these two significantly different types of loads. Convertibility of cargo space provides extreme flexibility and prevents empty runs of the vehicle. For example, a truck-trailer could handle piece goods such as palletized bags of sugar on one run and on a return run could handle bulk goods such as sugar in the bulk going back to the packaging factory; a plastics company could send finished goods in standard cargo space and return with a bulk load of resin; a brewer could send kegs or cases of beer and bring back malt or grains in the same vehicle, and there are many other uses of a similar nature.

The term "freight vehicle" encompasses any vehicle which could contain freight or cargo, including without limitation trucks, truck-trailers, railway cars, and movable containers such as are transported by ship, aircraft, truck and rail, as well as intermodal vehicles. "Piece goods" includes any individual item such as packaged or palletized goods commonly handled as individual pieces. "Bulk goods" includes any of the known and commonly shipped bulk granular or powder material.

Various convertible freight vehicles are already known; however, the known types all have certain disadvantages. For example, a van sold by Converta-Vans, Inc. of Wescoville, Pa. provides a cargo space with four separate convertible bulk hoppers utilizing gravity discharge from the hoppers and hinged floor sections above the hoppers. These hoppers make the van expensive and heavy, and the weight contributes to the energy expenditure of hauling. Moreover, general cargo vans are not easily converted to the Converta-Van configuration due to the necessity of providing the hoppers.

There also exists patented prior art on convertible freight vehicles, including U.S. Pat. No. 4,092,051, granted May 30, 1978. This patent similarly uses hoppers at the bottom of the bulk cargo space to assist in providing complete gravity discharge. The disadvantages of this hopper-containing vehicle are substantially the same as those of the Converta-Van product.

In U.S. Pat. No. 4,241,947, granted Dec. 30, 1980, there is shown a collapsible bulk storage member with slatted sidewalls, but it also has a fixed hopper-shaped bottom discharge. It is also subject to the same limitations as are present in the Converta-Van.

Thus, there is a need in the art to provide a simple, lightweight and inexpensive convertible cargo space in a freight vehicle which does not use hopper bottoms and which can be applied to conventional and existing freight vehicles with a minimum of modifications. This invention satisfies such need.

It is also known in the art to provide stationary bins for discharging free-flowing granular material which do not use hopper bottoms. See, e.g., British Patent No. 1,144,162. However, such stationary units are not suitable or practical for converting piece goods cargo space to handle bulk goods.

SUMMARY OF THE INVENTION

This invention provides improvements in a freight vehicle having a cargo space convertible for handling either piece goods or bulk granular, powder or flake material without the use of hoppers and with only minor modifications which add little weight to existing and known cargo space constructions now used for piece goods. More particularly, a cargo space for piece goods is provided with openings for filling and discharging bulk goods. A flexible, inflatable, double-walled generally cup-shaped bag with connections to the fill opening and the discharge opening is provided for holding the bulk material. The material, after being emptied to the extent allowed by gravity is then further emptied by inflation of the bag to nudge bulk material towards the discharge opening (pneumatically assisted gravity discharge). The bag rests on a movable bag support platform member which, when the cargo space is used for piece goods, is raised and stored with the bag above it at a position just under the roof of the cargo space.

BRIEF DESCRIPTION OF THE DRAWINGS

FIG. 1 is the side elevation view with the sidewall removed to view the inside of the convertible cargo space showing aspects of the invention in the mode for hauling bulk cargo.

FIG. 2 is a perspective view of a detachable discharge hopper according to one aspect of the invention.

FIG. 3 is an enlarged cross-sectional view of the engaging means of a detachable hopper as shown in FIG. 2.

FIG. 4 is a bottom elevational view of a discharge ring for attaching a detachable discharge hopper as shown in FIG. 2.

FIG. 5 is an enlarged view with portions broken away of the connecting means for attaching the detachable discharge hopper shown in FIG. 2.

FIG. 9 is a detailed elevation view, with portions broken away, of a platform locking assembly shown in FIG. 8, in the unlocked position.

FIG. 10 is a detailed elevation view of the locking assembly shown in FIG. 9, in the locked position.

DETAILED DESCRIPTION OF THE PREFERRED EMBODIMENTS

Figure 6:
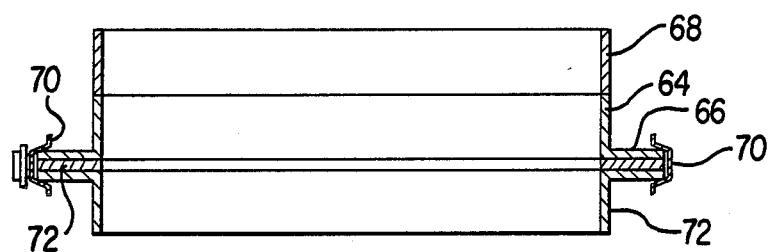
FIG. 6 is a cross-sectional view of a flanged bottom hopper ring of the hopper shown in FIG. 2 secured to a correspondingly flanged connector ring by a clamping ring.

As shown in FIG. 1, a freight vehicle is in the form of a conventional semi-trailer, although it could be any other cargo-containing space. In the form shown in FIG. 1, the trailer has wheels 14 for movement over a roadway R and a conventional support 16.

The cargo space of the trailer 12 has a conventional flat floor 18, sidewalls 20 (one shown in FIG. 1), a front-end wall 24, top wall 26, and a rear wall 28 which may conveniently contain access doors 29 as is conventional in such semi-trailers. The trailer thus described is a typical semi-trailer of the type commonly used to haul piece goods cargo with trucks. For converting the trailer cargo space for use in hauling either piece goods or bulk cargo, openings are provided for filling and discharge of bulk material.

The cargo space of trailer 12 in the present invention, can selectively haul bulk cargo in bulk cargo bags 30. In the embodiment shown in FIG. 1, there are four identical generally cup-shaped bulk cargo bags which are positioned in pairs on rigid platforms or bag bottom supports 32, the platforms 32 being raisable from the position for hauling bulk cargo as shown in FIG. 1 (bulk mode) to a storage position within several inches of top wall 26 so that the cargo space may be used for hauling piece goods (piece goods mode) as described in commonly owned U.S. Pat. No. 4,534,596, and copending application Ser. No. 673,770, filed Nov. 21, 1984, now U.S. Pat. No. 4,678,389.

In the bulk mode, the platforms are removably secured to the floor to prevent horizontal sliding movement of the platform on the floor of the trailer during transport. The securing means may include tabs 39 extending downwardly from platforms 32 that fit within corresponding keeper openings in the floor of the trailer.

Obviously, more or less than four bags may be used as desired or required by the cargo space available. The platforms also may be of a different configuration so long as they underlie and support the bag bottom. For example, application Ser. No. 673,770, now U.S. Pat. No. 4,678,389, discloses pairs of bottom bag supports interconnected by rigid support members to form suitable platforms for pairs of bags. The bags and their support platforms may be of any suitable shape, e.g., circular, oval, angular such as octagonal, square or rectangular.

The bags may be connected to corresponding platforms using any suitable means, as disclosed in application Ser. No. 673,770, now U.S. Pat. No. 4,678,389.

Each bag 30 is preferably provided with an individual fill opening 31 in the vehicle, which is preferably located in the roof of the vehicle. Alternatively, fill openings may be provided in a sidewall of the vehicle, with suitable means for delivering the bulk material to a bag. Each bag is also provided with an outlet 33 positioned to register with a discharge opening in the vehicle, preferably located in the floor of the vehicle, although discharge openings may be provided in the side of the vehicle with side discharge bags.

Each of the bulk cargo bags 30 is a double-walled cup-shaped bag having an inner wall 30a and an outer wall 30b, and discharges its cargo first to the extent allowed by gravity and then by pneumatically assisted gravity discharge as disclosed in U.S. Pat. No. 4,421,250. In order to provide the air for inflating the bags, each platform may carry a conventional blower 34 with suitable connections (not shown) to inflate and deflate the space between the walls of the bag through air inlet 37. Alternatively, the blower may be portable and selectively connectable to the bags to accomplish the inflation. Also, the bags may have lines connected to fittings to supply air or vacuum to the bags in the trailer from an unloading station.

A flexible cone 35 is provided for connecting the fill opening 31 to the top edge wall of bag 30.

For raising the platforms 32 and hence moving the bags from bulk storage position to the stowage position, a suitable lifting mechanism is utilized. As disclosed in application Ser. No. 673,770, now U.S. Pat. No. 4,678,389, a winch 36 operates to pull a plurality of cables 140 connected to a supoort platform. These cables may extend from four points on the storage platform vertically upward through a pulley support near the top of the storage space, and then horizontally across the top of the storage space to a pulley box 40.

When a power winch 36 is used, it is desirable from a safety standpoint to employ a warning buzzer and time delay mechanism to warn persons other than the operator that the bags are about to be lowered or raised.

Positioned adjacent the sidewalls 20 of the freight vehicle are support rails 42 which extend from a footing 44, that may be mounted on the floor but is preferably recessed therein, to the ceiling of the cargo space adjacent the sidewalls. Support rails 42 may include a top support plate 46, and a rail support plate 48 extending between footing 44 and top support bracket 46.

The bag support assembly includes a horizontal support structure 41 located at the ceiling of trailer 12, as disclosed in application Ser. No. 673,770, now U.S. Pat. No. 4,678,389.

In accordance with one embodiment, the discharge outlet 33 of a bag is provided with a detachable discharge hopper or sock 50. See FIG. 2. In accordance with this embodiment, an outlet ring 52 lines the outlet 33 of the cup-shaped bag 30, bag 30 being comprised of inner wall 30a and outer wall 30b. See FIGS. 1, 3 and 4. The outlet ring 52 has an outer surface 54 with a plurality of outwardly projecting pins 56.

The detachable discharge hopper 50 includes a top ring 58 having a plurality of keeper slots 60 corresponding to the projecting pins 56 of the outlet ring 52, for detachably bayonet-mounting the hopper 50 to the outlet ring 52. See FIGS. 2-5. The keeper slots 60 have lands 62 for engaging the pins 56, as most clearly shown in FIGS. 3 and 5. The detachable hopper 50 further includes a bottom ring 64 having an outwardly extending flange 66. A continuous hopper wall portion 68 of, for example, a flexible plastic material, connects the top and bottom hopper rings 58 and 64, respectively. See FIGS. 2 and 6. A clamping ring 70 for selectively engaging the flange 66 of the bottom hopper ring 64 is provided to clamp the bottom hopper ring 64 to a correspondingly flanged ring 72 connected to the place of delivery of the material during material discharge. A rubber gasket 72 provides a seal for pneumatic discharge of material from the bin.

Figure 7:
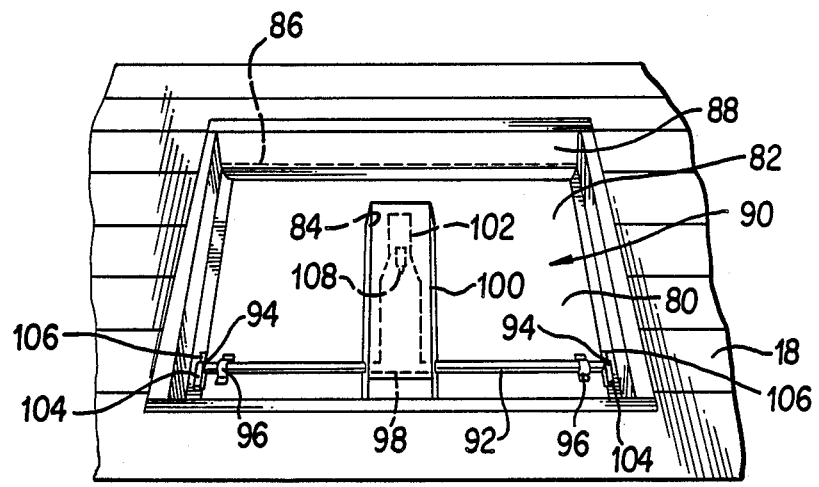
FIG. 7 is a perspective view of a recessed discharge opening hatch in the floor of a cargo vehicle.

FIG. 7 shows an improved hatch cover for selectively covering and sealing the discharge opening in the floor of a trailer from outside the trailer. In accordance with this embodiment, the hatch cover member 80 includes an inside portion 82 facing inside the cargo space of the trailer, and an outside portion 84 facing outside the trailer. The cover is connected by hinge 86, shown in phantom lines in FIG. 7, to a frame box 88 lining the discharge opening 90 in the floor 18 of the cargo space. The cover pivots downwardly and away from the cargo space along hinge 86, for discharge of material through the discharge opening 90.

For locking the hatch cover in place and sealing the discharge opening during transport of the trailer, a recessed, cam-type lock is provided having a pivotable rod 92 with two ends 94. Rod 92 is connected to the cover by clamps 96, within which the rod is rotatable about its own axis with the end of the rod on the inside portion of the cover. Rod 92 extends across the inside portion of the cover and passes through corresponding openings in an upwardly recessed handle box 100 to thereby expose a central portion 98 of rod 92 to the outside portion of the cover.

A handle 102, shown in phantom lines in FIG. 7, is fixedly connected to the outside portion 98 of rod 92 by any suitable means, such as by welding. A tab 104 extends perpendicularly from each end 94 of rod 92 on the inside portion 82 of cover 80, the tabs 104 being parallel with each other and with handle 102. For each of tabs 104, a corresponding notch 106 is provided in the frame 88 box of the discharge opening. Notches 106 allow corresponding tabs 104 to pass therethrough with handle 102 extending downwardly approximately 90° from the position shown in FIG. 7 while opening and closing the hatch. In the position shown in FIG. 7, tabs 104 are engaged with frame 88 with the hatch in the closed position and the handle horizontal to secure the hatch in the closed position. A slidable catch 108, shown in phantom lines in FIG. 7, is engagable with handle 102 on the outside portion of cover 80 to selectively lock handle 102 in the horizontal position shown in FIG. 7.

Means are provided for locking the bag bottom support platform 32 in a storage position within several inches of the top wall of the cargo space so that the cargo space may be used for hauling piece goods (piece goods mode). See FIGS. 8, 9 and 10. In accordance with this embodiment, a pair of locking assemblies 110 are provided for a platform 32 on each side of the platform (one pair shown in FIG. 8).

The locking assembly 110 includes a vertically operable lever 112 connected at its end 114 to a vertical support 116 adjacent the sidewall 20 of the vehicle. See FIGS. 8, 9 and 10. The lever 112 is connected to the vertical support by means including a pivot 118 having a horizontal axis, the lever being pivotable 180° between the down position shown in FIG. 9 and the up position shown in FIG. 10. A latch 120 having a keeper slot 122 is engageable with a pin 124 projecting from vertical support 116 with the lever 112 between the latch 120 and the vertical support 116, for securing the lever 112 in the up position shown in FIG. 10.

An arm 126 is connected to lever 112 and extends upwardly from the lever towards the roof of the cargo space. In the embodiment shown, arm 126 has a projection 128 passing through a corresponding keeper opening in lever 112 that is spaced apart from pivot 118 towards a handle portion 130 of lever 112. Accordingly, vertical movement of lever 112 between the up and down positions thereof, affects corresponding vertical movement of arm 126.

A horizontal lock bar 132 for selectively engaging a bottom portion of a bag support platform 32, is provided to lock the platform in the upper piece goods mode position. The horizontal bar 132 is pivotably connected to the end of arm 126 opposite lever 112. Lock bar 132 is pivotable approximately 90° about a vertical axis between an unlocked position shown in FIG. 9, and a locked position shown in FIG. 10. In the unlocked position shown in FIG. 9, the lock bar 132 is adjacent the sidewall of the cargo space out of position for engagement with a platform. In the locked position shown in FIG. 10, lock bar 132 extends away from the sidewall of the cargo space for engaging platform 32 and locking the platform in the upper position.

A first cam 134 is engageable with horizontal bar 132 during upward movement of lever 112, arm 126 and bar 132, for pivoting the horizontal lock bar 132 away from the sidewall of the cargo space from the unlocked position shown in FIG. 9 to the locked position shown in FIG. 10. A second cam 136 is engageable with the horizontal bar 132 during downward movement of lever 112, arm 126 and bar 132, for pivoting the horizontal bar 132 towards the sidewall of the cargo space from the locked position shown in FIG. 10 to the unlocked position shown in FIG. 9.

Figure 11:
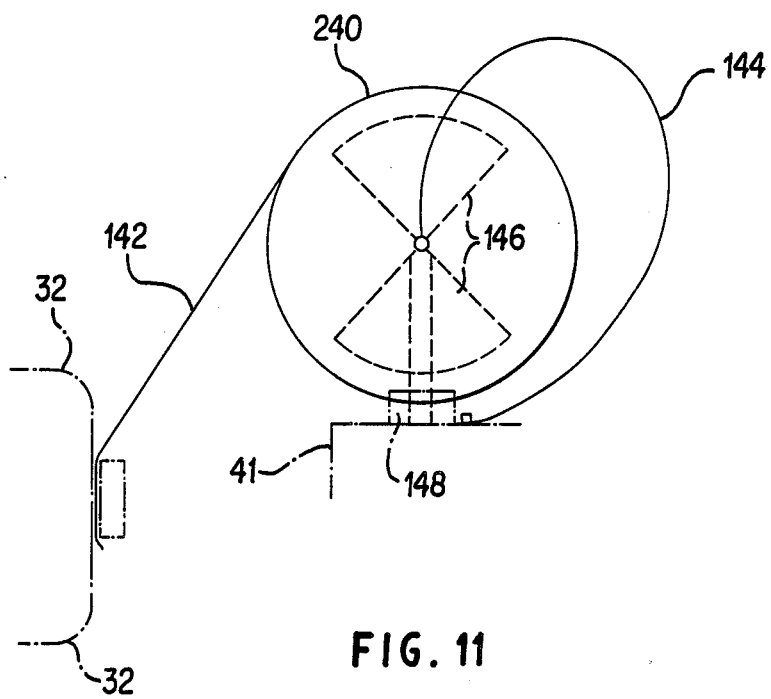
FIG. 11 is a schematic view of a retractable safety strap assembly with a centrifugally engageable clutch for arresting movement of the strap and a support platform connected thereto in the event of accidental free fall of the platform.

With the locking bars 132 of a support platform in the unlocked position shown in FIG. 9, the platform 32 is supported solely by hoisting cables 140 during raising and lowering of the bags. Safety straps are provided for each platform to prevent the platform from crashing down to the floor of the cargo space, and possibly injuring someone standing beneath the platforms, should the hoisting cables snap. The safety straps are similar to conventional self-retracting automobile seat belts that allow extension and retraction of the belt during slow movement thereof, but centrifugally engage and arrest motion of the belt during quick movement thereof. The features of a centrifugally engaging, self-retracting safety strap according to the invention, are schematically illustrated in FIG. 11. The safety strap assembly includes a rotatable spool 240 mounted on the upper support framework 41 adjacent the roof of the cargo space. A flexible strap 142, of nylon or suitably strong flexible material, has one end connected to platform 32 and another end connected to spool 240. Strap 142 is extendable from the spool to the floor of the cargo space when the platform is in the bulk mode. During lowering of platform 32 and extension of strap 142, a spring 144 (schematically shown in FIG. 11) is wound about the axis of rotation of spool 240. Accordingly, when platform 32 is raised, spring 144 unwinds itself and thereby automatically winds the strap 142 about spool 240 to retract the strap. Centrifugally engageable clutch means 146 and 148 (shown schematically in FIG. 11) are provided for arresting rotation of spool 240 when the spool rotates at a predetermined high rate of speed, as would occur in the event that hoisting cables snap and the platform is in free fall.

In operation, the trailer 12 may be used to haul bulk cargo by having the bags in the position shown in FIG. 1 (the bulk goods mode) as generally described in U.S. Pat. No. 4,534,596. Granular, powder or flake material of varying degrees of flowability or susceptibility to caking, bridging or ratholing, such as sugar, rice, flour, meal, plastic pellets, or the like, may be inserted through the fill openings in the trailer roof to fill the bags 30 to an appropriate level with the bag outlets 33 closed. A truck tractor is used to haul the bulk cargo to location and the bulk cargo may then be discharged. Material is discharged from bag 30 to the extent allowed by gravity until its angle of repose is reached or the material stops flowing. Then air from blower 34 is applied by connections (not shown) to the space between bag walls 30a and 30b, causing the top edge of the inner bag wall to move inwardly to nudge additional material into the discharge cavity and towards the discharge opening, to empty the bin.

After completely discharging the bulk cargo by gravity assist, the inner wall 30a is brought back to its original position by applying vacuum to the space between bags 30a and 30b, e.g., via suction from blower 34 or by other suitable sources of vacuum. If desired, other features such as automatic controls either on the vehicle or at an unloading station may also be utilized within the general scope of this invention.

Figure 8:
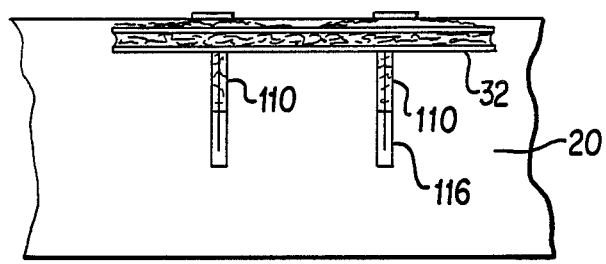
FIG. 8 is a schematic view of locking assemblies positioned to lock bag support platforms adjacent the roof of a cargo space, for hauling piece goods.

If the next trip of the trailer 12 is for hauling piece goods, such as bags or boxes loaded on pallets, the winch 36 is activated to cause the cables 140 to raise the platforms 32 to a position adjacent trailer roof 26, as shown in FIG. 8. Platform locking assemblies 110 then are locked to engage locking bars 132 beneath the bag support platforms in the raised position.

As can be seen, this invention can be applied to existing semi-trailers. For converting an existing trailer, all that need be done is provide openings in the floor and ceiling for the fill and discharge and then apply the inexpensive lightweight components of this invention. Such components may be supplied in kit form.

Although preferred embodiments have been illustrated, it will be apparent to those with skill in the art that variations within the scope of the invention can be made.

This invention provides tremendous advantages in converting a cargo space for piece goods selectively into cargo space for bulk goods without the large heavy hoppers conventionally used and thus with less weight which is saving of energy as well as construction and manufacturing costs.

What is claimed is:

1. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, with improvements in means for locking the bag bottom support platform in said upper position, the improvements comprising a locking assembly including:

(a) a vertically operable lever connected at one end to a vertical support adjacent the sidewall of the vehicle by means including a pivot having a horizontal axis, the lever having up and down positions;

(b) means for selectively securing the lever in the up position;

(c) an arm connected to the lever and extending upwardly from the lever towards the roof of the cargo space, wherein vertical movement of the lever affects corresponding vertical movement of the arm between up and down positions;

(d) a horizontal lock bar for selectively engaging a bottom portion of the bag support platform to lock the platform in said upper position, the horizontal bar being pivotably connected to an end of the arm opposite the lever, the horizontal lock bar being pivotable about a vertical axis between an unlocked position with the lock bar adjacent the sidewall of the cargo space out of position for engagement with the platform, and a locked position with the lock bar extending away from the sidewall of the cargo space for engaging the platform and locking the platform in the upper position;

(e) a first cam engageable with the horizontal bar during upward movement of the lever, arm and bar for pivoting the horizontal bar away from the sidewall of the cargo space from the unlocked position to the locked position; and (f) a second cam engageable with the horizontal bar during downward movement of the lever, arm and bar for pivoting the horizontal bar towards the sidewall of the cargo space from the locked to the unlocked position.

2. The vehicle of claim 1 wherein said horizontal bar pivots about 90°.

3. The vehicle of claim 1 wherein the lever pivots about 180°.

4. The vehicle of claim 1 including a plurality of said locking assemblies engageable with said platform.

5. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in the bulk-handling mode, the mechanical means including a support framework having portions adjacent to the roof of the cargo space, hoisting means for raising the bag bottom support platform from the floor of the cargo space to an upper position with the bag support platform adjacent to the roof of the cargo space with the bag collapsed to convert the cargo space to space suitable for piece goods handling, with improvements in means for controlling movement of the platform, the improvement comprising:
- (a) a rotatable spool mounted on the support framework adjacent the roof of the cargo space;
- (b) a flexible strap having one end connected to the platform and another end connected to the spool, the strap being extendable from the spool to the floor of the cargo space;
- (c) means for automatically winding the strap about the spool to retract the strap when the platform is raised; and
- (d) centrifugally engageable clutch means for arresting rotation of the spool when the spool rotates at a predetermined speed during extension of the strap.

6. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, the discharge opening having a frame, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, with improvements in a hatch for selectively covering the discharge opening, the improvements comprising:
- (a) a hatch cover member having inside and outside portions, the cover being hingedly connected to a frame box lining the discharge opening in the floor of the cargo space to pivot downwardly and away from the cargo space;
- (b) a pivotable rod having two ends, the rod being connected to the cover and extending across the inside portion of the cover with the ends of the rod on the inside portion of the cover and with a generally centrally located portion of the rod exposed to the outside portion of the cover through corresponding openings in the cover, the rod pivoting about its own axis;
- (c) a handle fixedly connected to the rod and extending perpendicularly from the rod on the outside portion of the cover;
- (d) a tab extending perpendicularly from each end of the rod on the inside portion of the cover, the tabs being parallel with each other and with the handle;
- (e) a notch in the frame of the discharge opening corresponding to each tab, to receive the corresponding tab with the handle extending downwardly to allow the tabs to pass through the notches while opening and closing the hatch, the tabs being engageable with the frame box when the hatch is closed and the handle is horizontal to secure the hatch in the closed position; and
- (f) a catch engageable with the handle on the outside portion of the cover to selectively lock the handle in the horizontal position.

7. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, with improvements in material discharge means, the improvements comprising:
- (a) an outlet ring lining the outlet of the cup-shaped bag, the outlet ring having an outer surface with a plurality of outwardly projecting pins;
- (b) a detachable discharge hopper including a top ring having a plurality of keeper slots corresponding to the projecting pins of the outlet ring for detachably bayonet-mounting the hopper to the outlet ring, the keeper slots having lands for engaging the pins; the detachable hopper further including a bottom ring having an outwardly extending flange, and a continuous wall portion connecting the top and bottom hopper rings;
- (c) a clamping ring for selectively engaging the flange of the bottom hopper ring to clamp the bottom hopper ring to a correspondingly flanged ring during material discharge.

8. The vehicle of claim 7 wherein the hopper wall portion is flexible.

* * * * *